(12) United States Patent
Zhang et al.

(10) Patent No.: US 6,553,409 B1
(45) Date of Patent: Apr. 22, 2003

(54) BACKGROUND CACHE SYNCHRONIZATION

(75) Inventors: Danpo Zhang, Issaquah, WA (US); Josh Cohen, Seattle, WA (US); Rajeev Dujari, Kirkland, WA (US); E. Castedo Ellerman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/350,331

(22) Filed: Jul. 9, 1999

(51) Int. Cl.[7] .................. G06F 13/00; G06F 12/00
(52) U.S. Cl. ................ 709/213; 709/214; 711/147
(58) Field of Search ................ 709/213, 214, 709/231, 235, 246, 310; 345/512, 541; 711/147, 118, 141, 144, 154; 725/115–117, 131

(56) References Cited

U.S. PATENT DOCUMENTS

| | | |
|---|---|---|
| 3,985,998 A | 10/1976 | Crafton |
| 5,390,318 A | 2/1995 | Ramakrishnan et al. |
| 5,442,760 A | 8/1995 | Rustad et al. |
| 5,448,708 A * | 9/1995 | Ward ........................ 709/235 |
| 5,517,652 A * | 5/1996 | Miyamoto et al. .......... 725/115 |
| 5,617,537 A * | 4/1997 | Yamada et al. ............. 709/214 |
| 5,628,015 A | 5/1997 | Singh |
| 5,737,599 A | 4/1998 | Rowe et al. |
| 5,787,470 A | 7/1998 | DeSimone et al. |
| 5,787,475 A | 7/1998 | Pawlowski |
| 5,829,022 A * | 10/1998 | Watanabe et al. .......... 711/118 |
| 5,863,207 A | 1/1999 | Powell |
| 5,864,852 A | 1/1999 | Luotonen |
| 5,889,958 A | 3/1999 | Willens |
| 5,906,658 A * | 5/1999 | Raz ............................ 710/39 |
| 5,923,855 A * | 7/1999 | Yamazaki .................. 709/248 |
| 5,987,506 A * | 11/1999 | Carter et al. ............... 709/213 |
| 5,991,760 A | 11/1999 | Gauvin et al. |
| 6,026,474 A * | 2/2000 | Carter et al. ............... 711/202 |
| 6,061,715 A | 5/2000 | Hawes |
| 6,067,565 A | 5/2000 | Horvitz |
| 6,085,226 A | 7/2000 | Horvitz |
| 6,112,231 A | 8/2000 | DeSimone |
| 6,119,153 A | 9/2000 | Dujari et al. |
| 6,219,728 B1 * | 4/2001 | Yin ............................. 710/52 |
| 6,233,606 B1 * | 5/2001 | Dujari ....................... 709/213 |

* cited by examiner

Primary Examiner—David Wiley
Assistant Examiner—George Neurauter
(74) Attorney, Agent, or Firm—Law Offices of Albert S. Michalik, PLLC (57) ABSTRACT

Two new cache control headers in the cache control header, "post-check" and "pre-check", enable the display of content from the cache, with a later synchronization of the content performed in the background via a conditional request such as an IMS request. These headers enable the server to define a non-validate time period relative to the cached content's age in which the user will receive content from the cache, a background synchronization period in which the user will receive content from the cache and automatically queue a request for background synchronization thereof, and a validate period in which the cached content may or may not be used, depending on a response to a validation request sent to the server. The content is quickly rendered for the user in the non-validate and background synchronization periods, and the hit count is correct in the background synchronization and validate periods. In the background synchronization time period, the user has a fast experience with rapidly rendered content, while via the background synchronization, the server receives the proper number of hits.

45 Claims, 6 Drawing Sheets

BACKGROUND CACHE SYNCHRONIZATION

FIELD OF THE INVENTION

The invention relates generally to computer systems, and more particularly to the caching of content such as downloaded network content.

BACKGROUND OF THE INVENTION

For network client applications, such as web browsers, a limiting performance factor is often low bandwidth to the server. To mitigate this low-bandwidth problem, network client applications often cache content replicated from servers, so that as much information as possible is kept available on the client user's hard drive. As data access times from the hard drive and RAM are typically orders of magnitude faster than download times, some or all of a server's content may often be rapidly accessed from the cache with little or no downloading of data from the server. Using a cache results in a faster user experience, less network traffic and less server burden.

While content caching thus provides substantial performance improvements, a problem with caching is that the locally cached content is static, whereas the actual content (e.g., network content) may or may not have changed. To avoid this problem, HTTP (hypertext transfer protocol) provides for sending a conditional request, e.g., an "If-Modified-Since" (IMS) request, an "If-None-Match" request, or the like to the server, identifying the content by a timestamp or entity tag. When the server receives such a conditional request, it uses the timestamp and/or entity tag to test whether the content has changed, and, if the content has not changed, the server responds with a "not modified" response, otherwise the server provides the modified content.

While this conditional request provides an overall increase in the available network bandwidth by reducing the amount of data that needs to be transmitted, not much in the way of savings is achieved at the server end. More particularly, the server often does almost as much work to determine if a content has been modified as it takes the server to simply retrieve and return the corresponding requested content. At the same time, many conditional requests may be made for content that is rarely, if ever, modified. This wastes server resources, increases client latency, and consumes available bandwidth.

One solution is to have the provider of the content include an "Expires" header comprising a date/time stamp, a "Cache-Control" header specifying a max-age relative to the current time, or the like. When cached, the local system ordinarily does not send a conditional request before the particular time determined by the expiry mechanisms. However, this only works when the content provider provides an appropriate timestamp header, which frequently does not happen, sometimes because it is not appropriate for the content to have a distant expires time, e.g., the content is expected to change frequently, and sometimes because it is simply not used by the provider.

Regardless of whether the data is stale or fresh, when the server is not involved with a user request, the hit count maintained at the server for the site is not correctly counted, even though the user views the content. This is often significant, as the hit count influences advertising revenue. The IMS solution prevents this problem, however as described above, IMS requests have their own problems, e.g., they are often very slow, particularly with a slow connection and/or a busy server, since a request and response is needed for each request for content validation.

SUMMARY OF THE INVENTION

Briefly, the present invention provides the ability to selectively use content from the cache, with a synchronization of the content performed in the background. To accomplish this state of operation, two parameters may be specified, "post-check" and "pre-check." These parameters enable a non-validate time period relative to the cached content's timestamp to be specified in which the content is used from the cache, a background synchronization period in which content from the cache is used along with an automatic request for synchronization of the content, and a validate period in which a request for validation of content (or the content itself) will be made.

For example, a server may specify in an HTTP header or the like the "post-check" and "pre-check" time-related values to establish three periods of time for synchronizing network content. In the non-validate and background synchronization periods, because cached content is used, (when available), an content will be quickly rendered for the user. In the background synchronization and validate periods, the hit count will be correct. If the server specifies the parameters, the server can control on a per-content basis in which state (time window) typical users primarily operate. For example, the server may set the parameter values such that users are mostly in the background synchronization time period for certain content, whereby the user has a fast experience via rapidly rendered content (including any advertising) from the cache, while via a background synchronization, the server receives the proper number of hits. Further, the server is still able to control how stale the cached data is allowed to become, so that even though the user is "one behind" in viewed content, the displayed content is known to be as relatively current as the server deems necessary.

Other advantages will become apparent from the following detailed description when taken in conjunction with the drawings, in which:

DETAILED DESCRIPTION

Exemplary Operating Environment

Figure 1:
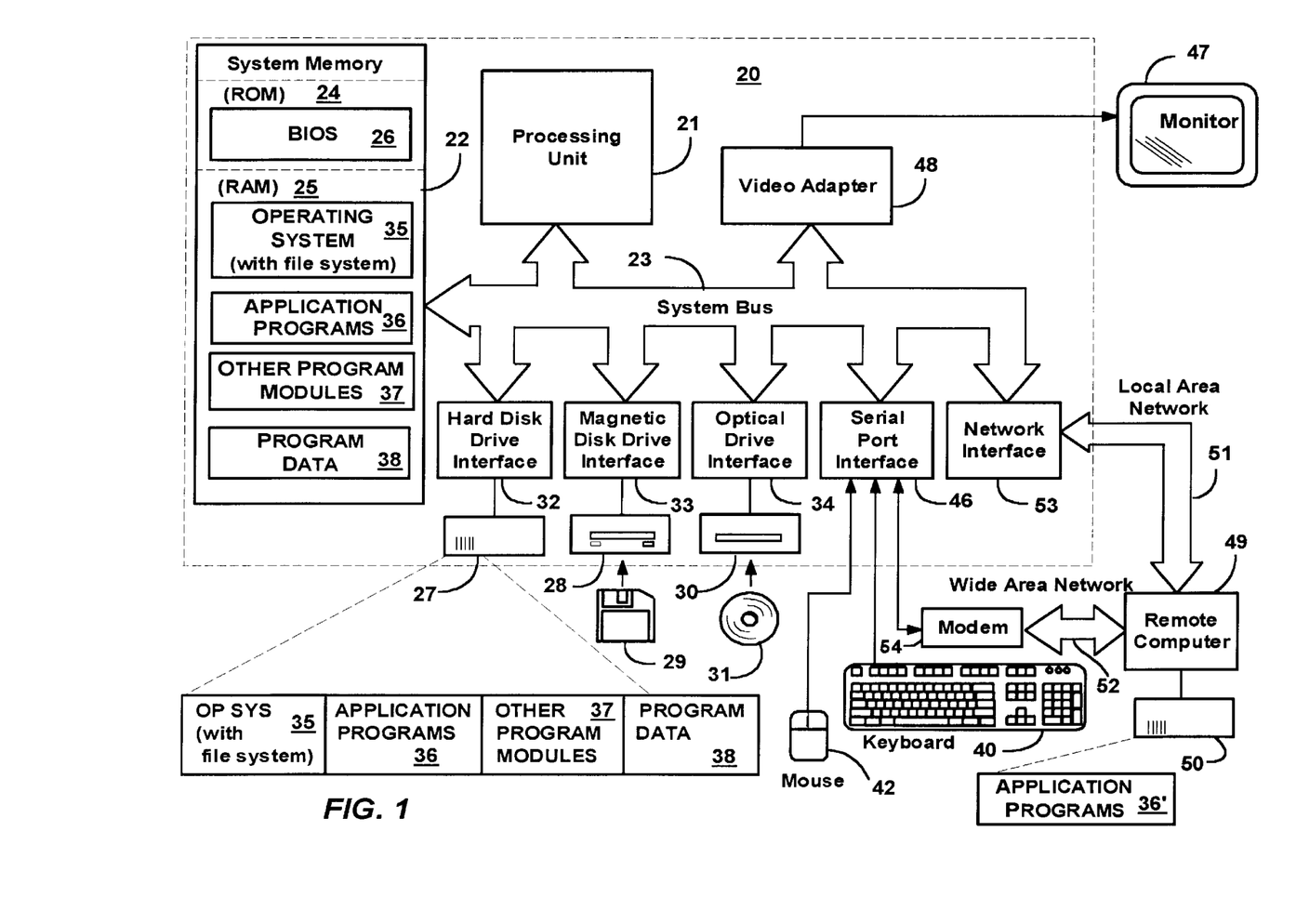
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Background Cache Synchronization

In general, a cache is a store of mappings between inputs and outputs of some relatively expensive function. Caches attempt to speed performance of the function by exploiting locality of reference. The function might be a local computation, a remote network operation, or even user input.

Network caches can reduce round-trip latency perceived by the client, load on the server, and network traffic. In the extreme case of a client or server being offline from the network, the cache serves as the only source of data. Examples of network caches are Microsoft® Corporation's Internet Explorer's HTTP (web) cache, DNS (name resolution) cache, and the Windows® NT file system network redirector cache (CSC). Some network caches may be time-invariant, such as a server that archives versions of software that are generally never updated later. This is a special case of network caches that may be incoherent with the server.

The mechanism of querying the server to determine if cached data is stale is called "synchronization." While the present invention is primarily described with reference to background synchronization of network caches for network content, it is understood that the present invention is applicable to virtually any type of synchronization.

Figure 2:
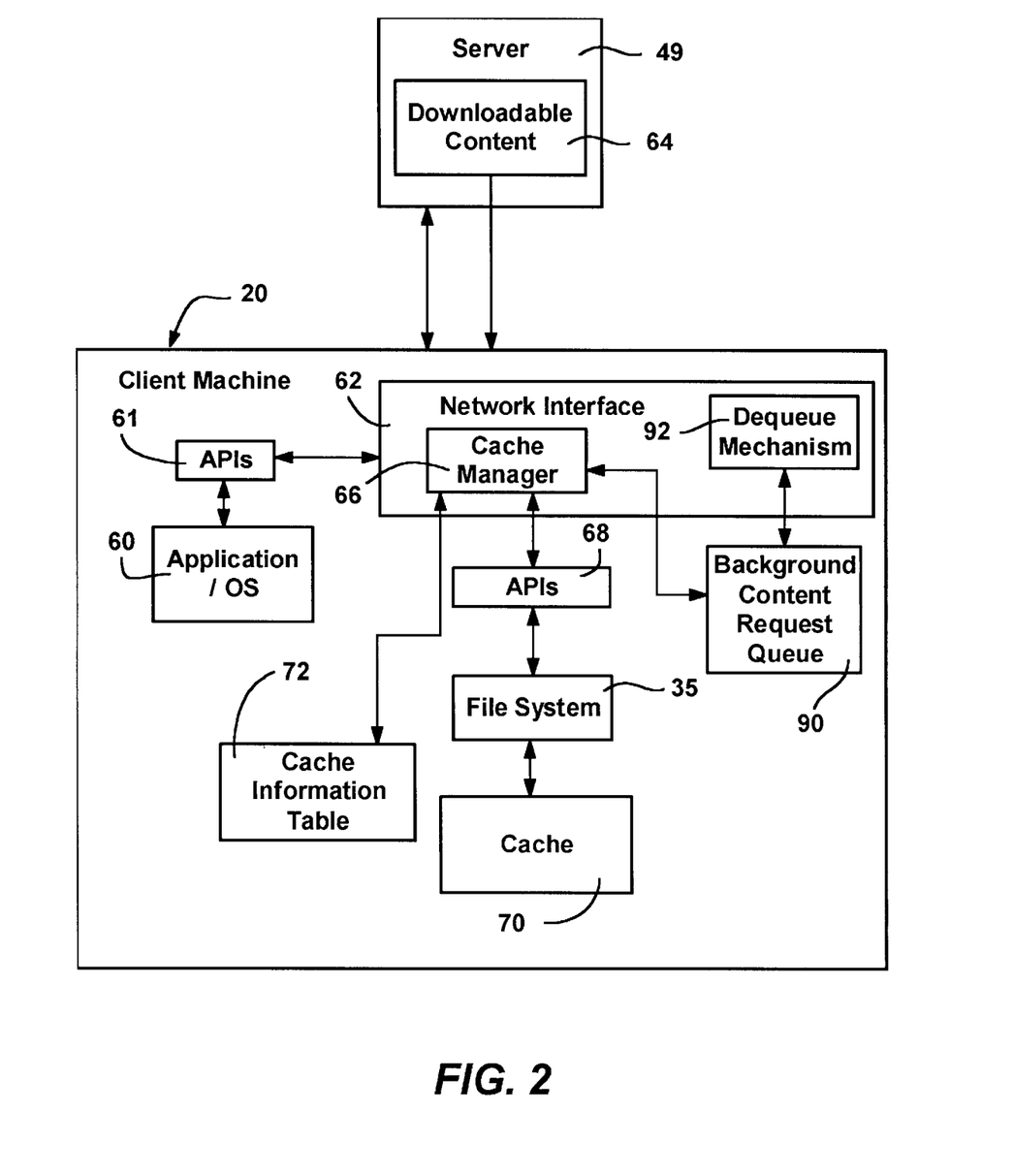
FIG. 2 is a block diagram representing a general architecture for caching content into which the present invention may be incorporated.

Turning to the drawings, FIG. 2 shows an architecture for caching content into which the present invention may be incorporated. In FIG. 2, a network application 60 (or operating system) such as including a browser, is loaded in a client machine (e.g., the personal computer system 20), and communicates via APIs 61 and a network interface 62 with a server (e.g., the remote computer 49) in order to download content 64 therefrom. Communication between the client 20 and the server 49 may take place using one of several well-known network protocols, such as hypertext transfer protocol (HTTP), file transfer protocol (FTP), Common Internet File System (CIFS) protocol, or Gopher, although for purposes of simplicity, the invention will be primarily described with respect to HTTP. Content available through these protocols may also be downloaded from the server to the client by alternative means, such as a multicast protocol or CD-ROM installation, for example. As used herein, "server" or "network server" includes any machine or combination of machines having content thereon. Network servers may thus include HTTP "web sites," including those having sites with different names (which may be regarded as different virtual servers even if they are hosted on the same physical machine). Note that a web site may be distributed over many virtual servers, which in turn may be distributed over many physical machines.

In any event, the network interface 62 includes or otherwise accesses a cache manager component 66 that includes code for caching some or all of the content 64, ordinarily via application programming interface (API) calls through APIs 68 to the operating/file system 35. For example, each distinctly referenced portion of a server's content 64 may be stored as a file in one or more caches 70. Note that some or all of the various components referenced herein may be combined with or included within other components, while others may be separate from one another and be appropriately invoked as needed. For example, the cache manager component 66 may be part of the network interface 62, or application 60 (e.g., browser) code, or may be a separate component, (e.g., object, dynamic link library function and so on) that other network applications may call on.

As also shown in FIG. 2, the cache manager 66 accesses a table of cache information 72 or the like, including for example, a list of files in the cache 70 for corresponding local file system references (e.g., filenames or numbered identifiers) with server references (e.g., URIs). The table 72 also includes any expiry information for each cached file.

In accordance with one aspect of the present invention, there is provided a method and system via which a certain state (e.g., a period of time) may be specified, and when in that state, the cached information is used while a request to synchronize the information is output. For example, three periods of time may be specified, each of which corresponds to a different state that content may be in, i.e., based on the age of the content. Depending on the age of the content with respect to the time periods, the current state of operation may be varied with respect to whether and how the cached content is retrieved and/or synchronized. In one of the time periods, data from the cache is retrieved, while a request to synchronize that data (for its next use) is output.

Other possible states may be based on virtually any information that may be measured for comparison therewith, e.g., states based on system resource conditions (e.g., low memory or low disk capacity), or network conditions, (e.g., high latency). The states may be specified by a user, an application (such as the application 60), or a server such as the server 49. For example, a user may request, e.g., through a graphical user interface (GUI) on the application 60, a state in which content is to be retrieved from the cache, and a background synchronization performed. As another example, an application such as a browser could set a time for background synchronization of content from selected servers, so that somewhat fresh content is always available in the cache. Further, as is described in detail below, the server 49 can specify the state for background synchronization.

Figure 3:
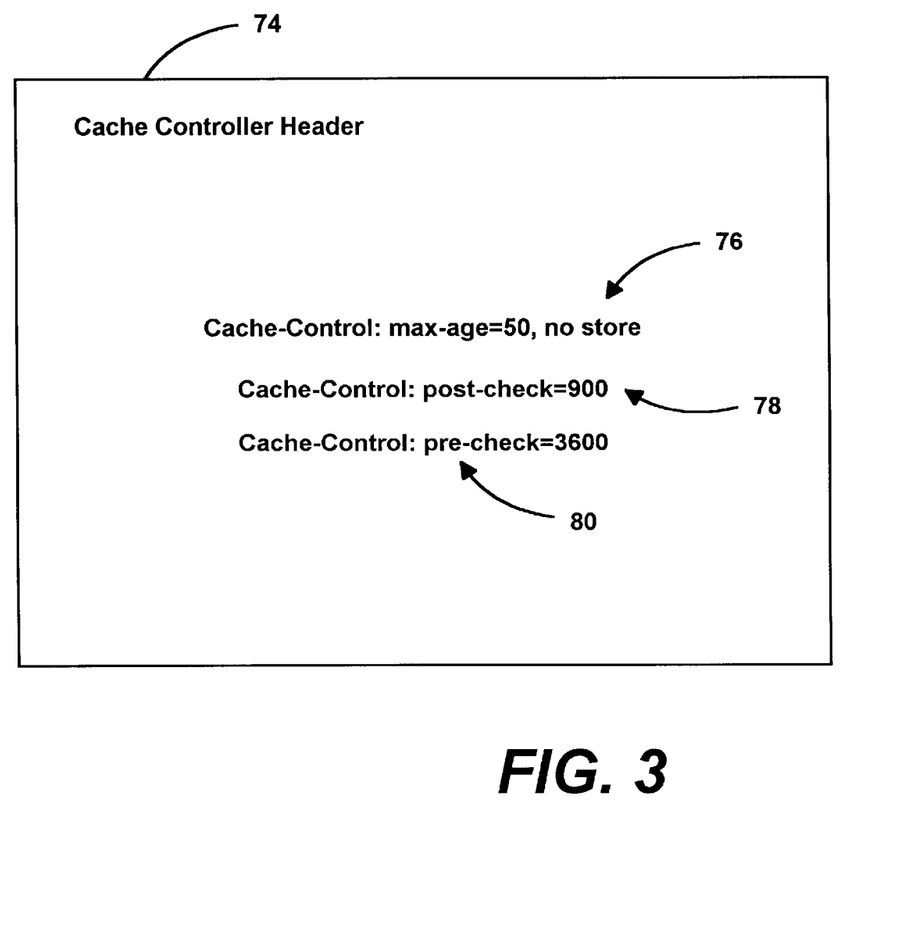
FIG. 3 is a representation of an exemplary cache control header in accordance with one aspect of the present invention.

FIG. 3 shows how the present invention may be implemented in HTTP, wherein the server specifies three states (e.g., periods of time relative to an age/timestamp of some cached content) for determining cache-related operations. In a preferred embodiment shown in FIG. 3, the server 49, via an HTTP header 74, defines how and from what source content will be received, i.e., the cache 70 or the server 49 depending on time-based parameters. The cache control header 74 may include an expires header 76, a "post-check" header extension 78 and a "pre-check" header extension 80. As is known, the expires header 76 specifies an age, relative to a timestamp on the content (or possibly the current time), in which the content will expire, upon which validation of the content should take place.

In accordance with one aspect of the present invention, when present in an HTTP header, the post-check header extension 78 defines a time after which an entity/resource (e.g., the content) is to be checked for freshness. As will be described in further detail below, the check for freshness may occur in the background (background synchronization), and occurs after the content from the cache 70 has been used. The pre-check header extension 80 defines a time after which an entity is to be checked for freshness, prior to using the entity. Although the post-check header extension 78 and the pre-check header extension 80 are described as "headers" or header "extensions," other types of metadata could be used to provide these informational functions.

The pre-check header extension 80 and the post-check header extension 78 can be added to a normal HTTP header. For example, in FIG. 3, the pre-check header extension 80 and the post-check header extension 78 may be added to a cache control header 74 that also includes the expires header 76. In one implementation, the existence of the post-check header extension 78 and the pre-check header extension 80 overrides the use of the expires header 78. When no post-check header extension and/or pre-check header extension are present, the expires header 78 may be utilized, as described below.

Figure 4:
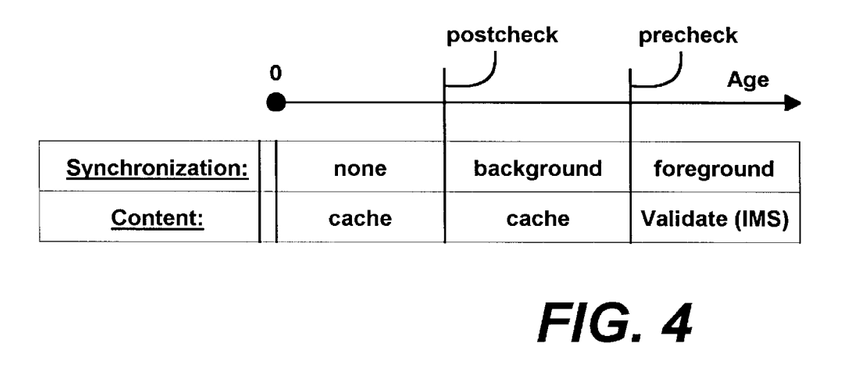
FIG. 4 is a chart representing how a cache is used and content is synchronized in accordance with one aspect of the present invention.

In the HTTP implementation, the post-check header extension 78 and the pre-check header extension 80 are used to set the boundaries of three distinct time periods relative to the cached content's age, wherein one period specifies when background synchronization occurs. As exemplified in FIG. 4, in a "non-validate" period, (e.g., the cached content is zero to 15 minutes old), content from the cache 70 is used, and no synchronization is requested. In a "background synchronization" period, (e.g., the cached content is 15 to 60 minutes old), the content from the cache 70 is used, and a request for background synchronization is output, e.g., a task corresponding to the request is queued on a request queue 90 (FIG. 2). For example, the task may correspond to sending an If-Modified-Since request. In a "validate" period, (e.g., the cached content is 60 minutes or older), a request for validation of the content (e.g., an If-Modified-Since request) is sent to the server in the foreground, and then content is provided to the user either from the cache 70 or from the server 49 depending on the server's response. Note that additional information may establish additional states, e.g., three-header extensions may be used to specify four periods with distinct operating differences, and so on. States may also be differentiated according to more complex combinations of parameters, e.g., request background synchronization on weekends, not on weekdays, and/or when system resources are available, and so forth.

In the above example, by defining the post-check header 78 and the pre-check header 80 for given content, the server determines how rapidly that content is viewed versus its freshness, and how accurately hits are counted. In the non-validate and background synchronization time periods, the user has a fast experience with rapidly rendered content, including any advertising that the provider desires that the user see. In the background synchronization and validate periods, via the background synchronization or validation request, respectively, the server receives the proper number of hits, useful for measuring site popularity and the like. In the validate period, the server is able to control how stale the content is allowed to become, so that even though the user is "one behind" in viewed content, the displayed content is known to be as relatively current as the server deems necessary.

As also described in the above example, in the background synchronization time period, the content from the cache 70 is used, and synchronization is performed in the background, e.g., by a background task. Background synchronization functions by sending a conditional request such as an IMS request or the like to the server 49, identifying the content to be retrieved by a timestamp or entity tag. As with normal foreground conditional requests, when the server 49 receives the conditional request, it uses the timestamp and/or entity tag to test whether the content has changed, and, if the content has not changed, the server responds with a "not modified" response, otherwise the server provides the modified content.

Content that is received via a background synchronization normally replaces any previously stored content in the cache 70, while the older cached content is used. That content will then be available (for at least some time) so that the user can receive the content from the cache 70 on the next request for content. The content is also available to a user working offline.

In the situation where cached content is being displayed to a user while new content is received via background synchronization, instead of displaying the cached content now and the new content the next time, it is alternatively feasible to overwrite the displayed content with the new content. This operation may be disruptive to the user, however, because the user first sees previously downloaded content from the cache 70, and then the cached content disappears and is replaced by the newly downloaded content. Nevertheless, a benefit is that the user may be provided with the most recent content once it is available, and the updated rendering may be very fast since it has been already downloaded. other options are also available, e.g., the content renderer (application or operating system 60) may provide a user interface or the like that notifies the user that new content has been received in a background synchronization, (e.g., a flashing refresh button), whereby the user may request the newly downloaded content via the same or another user interface. The newly downloaded content is then provided to the user, with or without initiating another request for content from the server 49.

Figure 5:
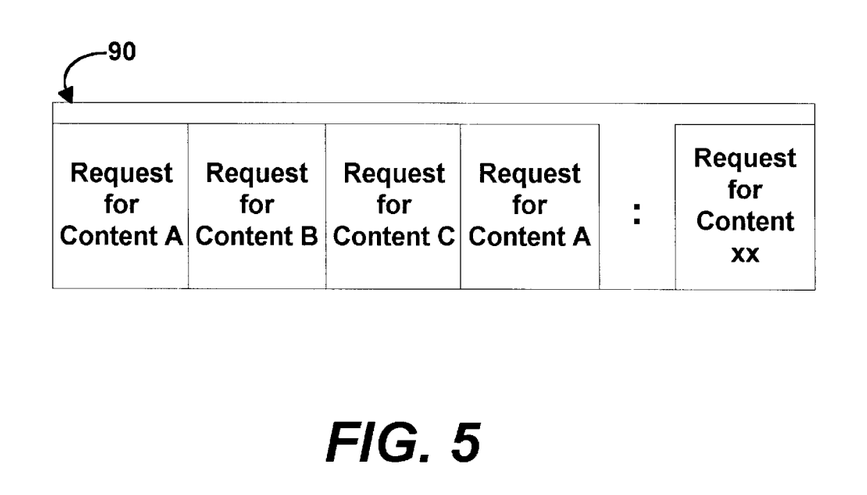
FIG. 5 is a representation of a queue for queuing background requests for content in accordance with one aspect of the present invention.

To perform background synchronization, when the content is in the background synchronization (retrieve-from-cache, request-background-synchronization) state, the cache manager 66 (FIG. 2) outputs a request for synchronizing the content, preferably by queuing the request into a request queue 90 (FIG. 2 and FIG. 5). A dequeuing mechanism 92 (FIG. 2), such as implemented in a thread, dequeues the requests when appropriate and sends them to the server. Note that by dequeuing immediately or as soon as possible, or simply by directly sending the request, background synchronization may begin essentially simultaneously with the retrieval and use of content from the cache 70. However, in a preferred implementation, each request for background synchronization creates a task, and the task is saved to a list, such as a first-in, first-out (FIFO) queue. As described below, the tasks are dequeued according to a defined process and/or parameter, e.g., after some amount of socket idle time in which an HTTP request or the like (e.g., FTP) has not been made. The dequeued task then performs the background synchronization (e.g., sends an IMS request) for validating the requested content. In one implementation, the time for dequeuing is reached at approximately five seconds of idling, although other times and criteria may be selected for other implementations as desired and appropriate.

Note that the background synchronization is not guaranteed in all scenarios, such as if the machine is shut down while requests are queued. To prevent this, cache manager component 66 may persist the queue, such as automatically and/or on shutdown. Also, another case where the background request may not be fulfilled is if a request requires user interface. For example, authentication may require prompting the user for credentials, but this is typically not a problem, since the background request may use the credential cache.

Alternate criteria (parameters) for dequeuing a task could be defined. For example, tasks may be dequeued according to socket idle time in which a user/network connection is not performing activity, e.g., socket idle time in which there are no HTTP, FTP, CIFS, Gopher activities or the like). Dequeuing may also occur based upon parameters that may be time invariant, such as the resources of the client machine 20, e.g., how much memory is available, and so forth. Various permutations of factors may determine the criteria.

As an alternate to the FIFO queue, the tasks could be queued in any collection, data structure or list, and could be dequeued according to a defined (or even random) order, e.g., tasks could be dequeued in order of importance, or according to a hierarchy.

When queuing background synchronization requests, it is possible that more than one request for validating the same content will be present in the queue at the same time. For example, as represented in the request queue 90 of FIG. 5, two requests to synchronize the same content ("Content A") have been queued. A straightforward way to handle multiple tasks requesting validation of the same content, while preserving the accuracy of the hit count maintained at the resource (server), is to treat the tasks separately, i.e., send distinct requests for such common tasks. Alternatively, multiple queued tasks requesting the same content may be matched and collapsed to a single task. To maintain the hit count in such a situation, a counter or the like may be sent with the collapsed request to inform the resource of the number of actual requests made for the content. The resource may use the multiple hit count information as desired, e.g., sum the counts provided, ignore the sum and count the request as one hit, count multiple hits separately from single hits, ignore sums exceeding some certain limit, and so forth.

Figure 6:
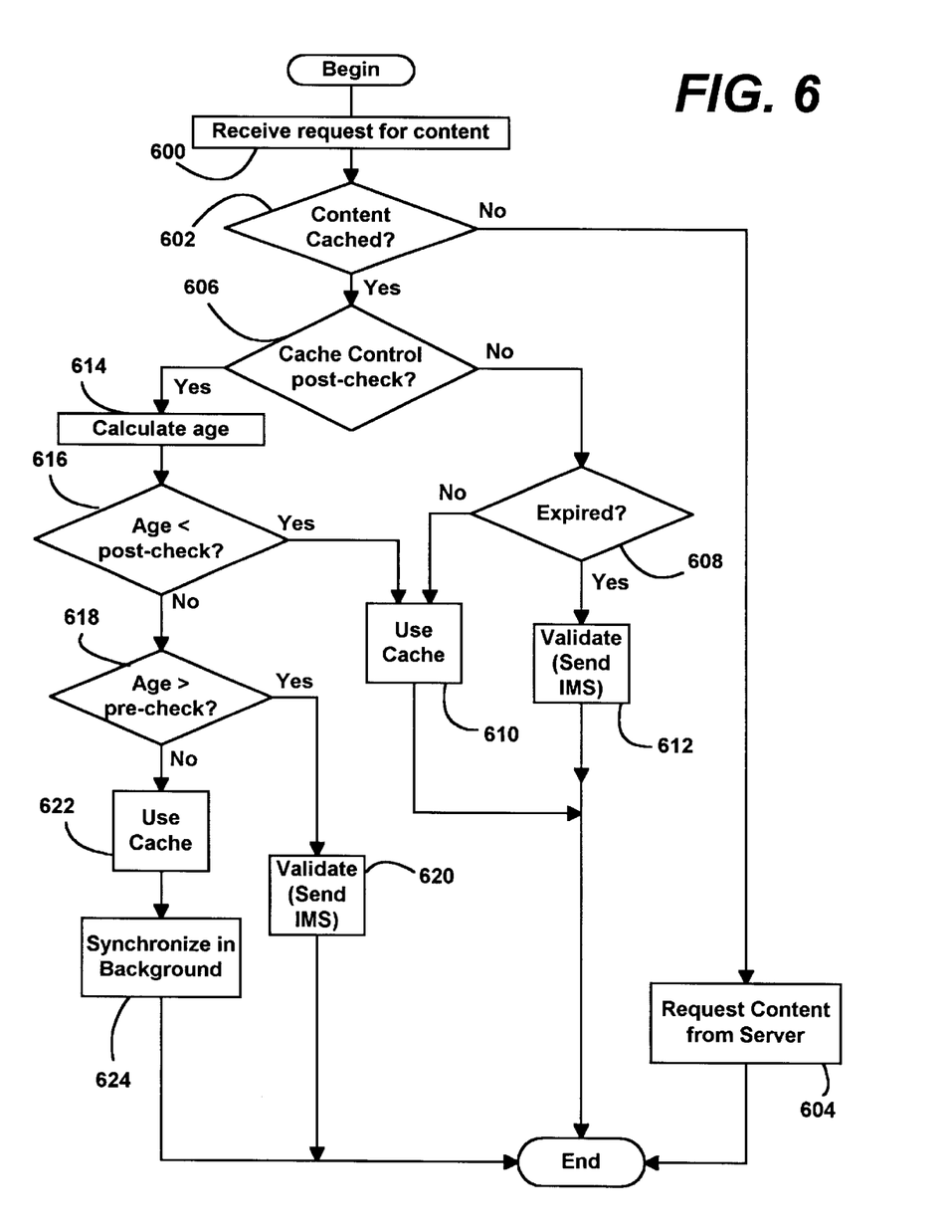
FIG. 6 is a flow diagram generally representing the steps for determining synchronization and the source of content in accordance with one aspect of the present invention.

Turning now to an explanation of the operation of the present invention, FIG. 6 represents a general overview of a process for determining synchronization and source of requested content in accordance with one aspect of the present invention. In FIG. 6, the example of the post-check, pre-check and expires header is described herein, however it may be readily appreciated that alternative states, criteria and so forth may be tested for and applied as appropriate. Beginning at step 600, when a request for content is received, the cache manager 66 first looks to see at step 602 if the requested content is in the cache 70. The requested content may be in the cache 70 from a prior content download, or could be available in the cache by alternative means, such as via a multicast protocol or CD-ROM installation, for example. If the requested content is not available, step 602 branches to step 604 wherein the request is otherwise handled, i.e., the request is sent to the server to retrieve the content.

If instead at step 602 the requested content is in the cache 70, step 602 branches to step 606 which determines if the requested content within the cache includes the post-check cache-control header 78 (and/or alternatively, the pre-check header). If not, step 606 branches to step 608 wherein a determination is made if the requested content within the cache 70 is expired, such as by evaluating the information within the expires header 76, for example. If the content within the cache 70 has not expired, step 608 branches to step 610 wherein the user receives the content within the cache 70 (e.g., content is rendered). If the content within the cache 70 has expired, step 608 branches to step 612 to validate the content via an IMS request or the like (or simply request new content).

However, if at step 606 the post-check cache-control header 78 is found to be present, step 606 branches to step 614 where the age of the content within the cache 70 is calculated. As stated above, a number of different criteria (parameters) can be used to determine when and if background synchronization is to occur. In the present example, the age of the content within the cache 70 is compared relative to the present request, and the determination of whether background synchronization is to occur is based upon that age. To determine the age, the time that the content within the cache 70 was retrieved is subtracted from the time of the present request, and the result is converted, as necessary, to a selected unit (e.g., seconds).

After the age is calculated, at step 616 the age of content within the cache 70 is compared against the parameter defined for the post-check header 78 (in the example shown in FIG. 3, 900 seconds). If the age is less than the parameter for the post-check header 78, step 616 branches to step 610 wherein the user receives the content within the cache 70 (e.g., content is rendered therefrom). If, however, the age is greater than the parameter for the post-check header 78, then step 616 branches to step 618 wherein the age is compared to the parameter for the pre-check header 80. An appropriate action can be defined for the unlikely event that the age equals the parameter for the post-check header 78, e.g., step 616 branches to step 618.

If the age of the content within the cache 70 is greater than the parameter for the pre-check header 80 (in the example shown in FIG. 3, 3600 seconds), then step 618 branches to step 620, where the content is then appropriately handled, e.g., validated via an IMS request or the like. In this event, the IMS request occurs in the foreground, i.e., content is not provided to the user until a response to the IMS request is received, i.e., a "not modified" response, or (at least part of) the new content.

In accordance with one aspect of the present invention, if however, the age of the content within the cache 70 is less than the parameter for the pre-check header 80, then step 618 branches to step 622 wherein the user receives the content within the cache 70 (e.g., content is rendered). In addition, at step 624, a request for background synchronization of content is output, e.g., queued.

Figure 7:
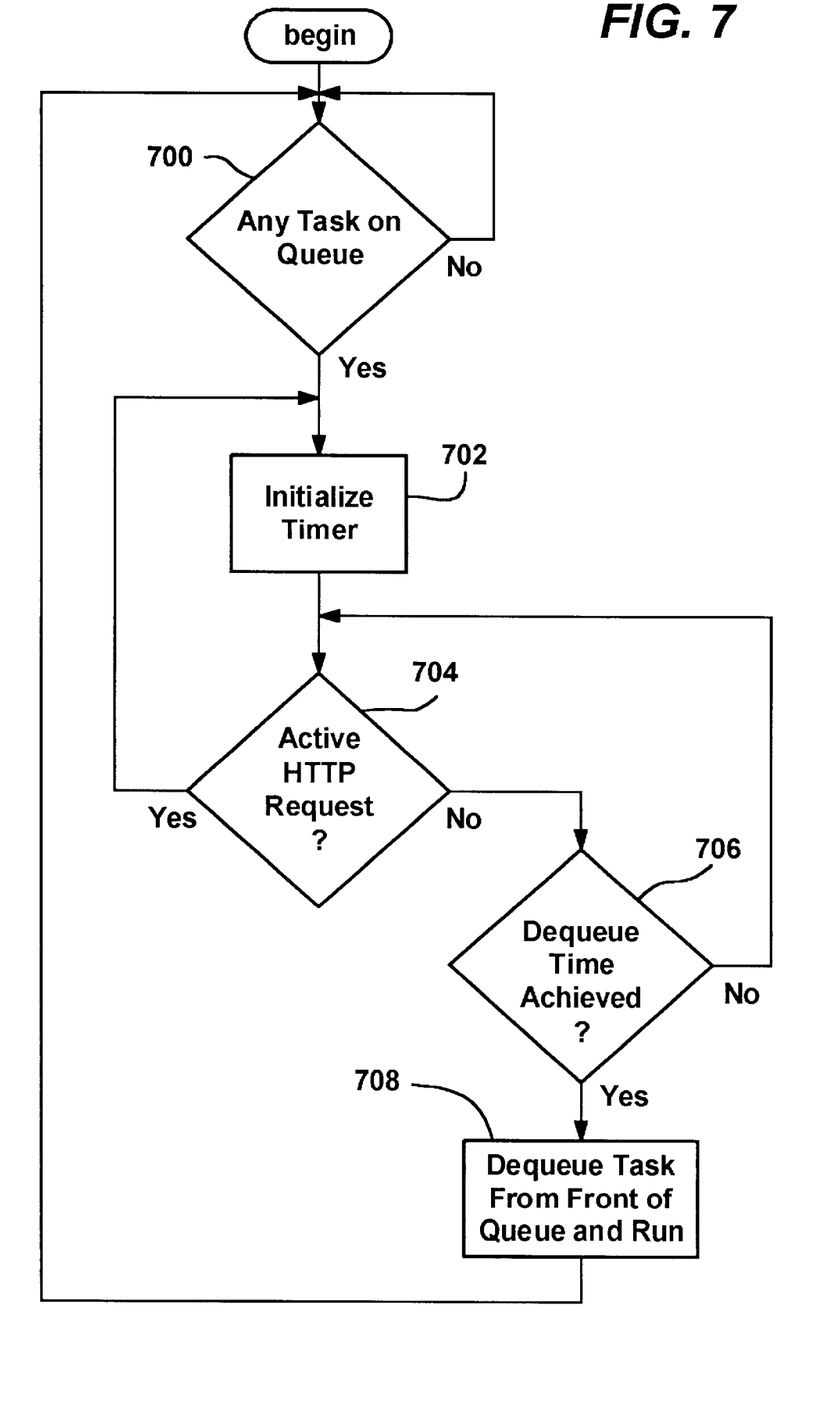
FIG. 7 is a flow diagram generally representing the steps for dequeuing queued tasks corresponding to requests for synchronizing content in accordance with one aspect of the present invention.

FIG. 7 generally represents the actions taken by a thread to dequeue the queued tasks for requesting content valida-tion. In general, as described above, synchronization may occur according to a defined parameter, such as after five seconds in which there has not been foreground HTTP activity. The background synchronization thus attempts to limit its impact on the foreground process. As shown in FIG. 7, beginning at step 700, if any task is in the queue, (e.g., the thread blocks until a task is queued), step 702 is executed to initialize (e.g., reset and start) a timer. Step 704 then tests if any HTTP activity is taking place, one of the factors in the present example for determining whether to dequeue. If so, step 704 branches back to step 702 to await idle socket activity.

If instead at step 704 no HTTP request or the like is active, step 704 branches to step 706 to test whether the time for dequeuing, e.g., an idle time of five seconds, has been achieved. If not, the process loops back to step 704 until either the socket idle time is achieved, or an HTTP request or the like is detected. If such a request is detected at step 704 before the socket idle time is achieved, the process returns to step 702 where the timer is re-initialized and the wait for required idle time restarted. If the idle time is achieved, the task is dequeued and the validation request sent to the content source. Note that to avoid a recursion problem, background synchronization tasks are flagged so that a dequeued background task will not initiate a new background task. For example, when flagged, the request for content does not go through the full process shown in FIG. 6, but instead sends a validation request to the server regardless of the presence of the post-check and pre-check extensions. The dequeuing process then returns to step 700 to dequeue other tasks, if any, in the same manner.

Although not necessary to the present invention, for efficiency, the present invention may select only content that has certain properties for background synchronization, i.e., content which is deemed most likely to be changed, and not synchronize those items that are likely to be unchanged. In other words, one criterion for determining whether the state in which background synchronization may take place is achieved may be type of content. For example, image data (e.g., JPEG or GIF files) are considered the most likely to be stable, with animations and other like data also being likely candidates. For such file types, normal expiry processing may be used instead of background synchronization, since such file types should not have to be refreshed on a regular basis, even in the background. Thus, a significant advantage may be obtained by distinguishing among content types, thereby increasing operating efficiency.

Lastly, while the present invention has been described with reference to web caching, it can be readily appreciated that the present invention applies to other types of caching. For example, in a web cache, the input is a URL and the output is some content data and metadata, (e.g., http response headers, last synchronization time, and so on). However, such mapping need not be performed at a remote server, e.g., the results of mapping a username to a set of security policies may be cached. Synchronization is applicable whenever the mapping function is not time-invariant, including when it is computed by a remote server, or something at the client where the result depends on a changing environment.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium including computer-executable instructions for performing steps comprising,
   maintaining information with cached content indicative of a state for using and synchronizing the cached content;
   receiving a request for content corresponding to the cached content;
   comparing current state information to the state for using and synchronizing the cached content, and if the state for using and synchronizing is achieved relative to the current state information, using the cached content without waiting for a synchronization result and outputting a request to synchronize the content.

2. The computer-readable medium of claim 1 wherein the state for using and synchronizing the cached content corresponds to a time period, and wherein comparing current state information includes evaluating the age of the cached content with respect to the time period.

3. The computer-readable medium of claim 2, wherein the information indicative of a state for using and synchronizing the cached content comprises, a post-check variable that specifies a first time parameter, and a pre-check variable that specifies a second time parameter.

4. The computer-readable medium of claim 3, wherein comparing current time information to the time for using and synchronizing the cached content and determining if the time is achieved comprises determining whether the current state information corresponds to a time between the first time parameter and the second time parameter.

5. The computer-readable medium of claim 1 wherein outputting a request includes queuing a task corresponding to the request to synchronize the content.

6. The computer-readable medium of claim 5, wherein the task is queued in a FIFO queue.

7. The computer-readable medium of claim 5 including further computer-executable instructions for, dequeuing the request to synchronize the content.

8. The computer-readable medium of claim 7, wherein the request to synchronize the content is dequeued according to a set of criteria.

9. The computer-readable medium of claim 8, wherein the criteria includes a time duration during which there is no request for content.

10. The computer-readable medium of claim 1 including further computer-executable instructions for synchronizing the content.

11. The computer-readable medium of claim 1 including further computer executable instructions for, associating information with the cached content indicative of a second state for using and not synchronizing the cached content.

12. The computer-readable medium of claim 11 including further computer executable instructions for, comparing current state information to the second state for using and not synchronizing the cached content, and if the second state is achieved, using the cached content.

13. The computer-readable medium of claim 12, wherein the information indicative of a second state for using and not synchronizing the cached content comprises, a variable associated with the cached content that specifies a time parameter.

14. The computer-readable medium of claim 1, wherein associating information with cached content comprises, including in a cache control header associated with the cached content a post-check header extension that specifies a first time parameter and a pre-check header extension that specifies a second time parameter.

15. The computer-readable medium of claim 14, wherein the cache control header further includes an expires header.

16. The computer-readable medium of claim 15 having further computer-executable instructions for determining whether the post-check header extension or the pre-check header extension is present, and if neither are present, utilizing the expires header.

17. The computer-readable medium of claim 1 wherein using the content includes rendering an image therefrom.

18. A method for selectively using cached content, comprising,
   maintaining information associated with cached content, the information indicative of a state for using and synchronizing the cached content;
   receiving a request for content corresponding to the cached content; and
   determining from current state information whether the state for using and synchronizing the cached content is achieved relative to the current state information, and if the state is achieved, using the cached content without waiting for a synchronization result and synchronizing the content in a background operation.

19. The method of claim 18 wherein synchronizing the content in a background operation includes queuing a task.

20. The method of claim 19 wherein synchronizing the content in a background operation includes dequeuing the task and providing a conditional request to a server to synchronize the content.

21. The method of claim 20 wherein synchronizing the content in a background operation includes receiving a response from the server indicating that the content is valid.

22. The method of claim 20 wherein synchronizing the content in a background operation includes receiving updated content from the server.

23. The method of claim 18 wherein using the content includes rendering an image therefrom.

24. The method of claim 18 wherein maintaining information associated with cached content includes maintaining data in association with the content that specifies a time period as the state for using and synchronizing the cached content.

25. The method of claim 24 wherein the data comprises a post-check extension and a pre-check extension of an HTTP header.

26. The method of claim 24 wherein the data further comprises expiry information.

27. In a computer system, a system for synchronizing content and returning requested content, comprising:
   a cache with content stored therein; and
   a cache manager mechanism for receiving a request for content corresponding to the cached content and for evaluating information associated with the cached content indicative of a state for using and synchronizing the cached content, the cache manager mechanism comparing current state information to the state for using and synchronizing the cached content, and if the state is achieved relative to the current state information, returning the cached content without waiting for a synchronization result and outputting a request to synchronize the content.

28. The system of claim 27 wherein the content is network content of a server.

29. The system of claim 27 wherein the request for content is made by an operating system or application.

30. The system of claim 27 wherein the information indicative of a state specifies a time period.

31. The system of claim 30, wherein the information associated with the cached content comprises a post-check header that defines a first time parameter and a pre-check header that defines a second time parameter which together specify the time period, and wherein the mechanism for comparing current state information to the state for using and synchronizing the cached content determines whether a time corresponding to the current state is within the time period.

32. The system of claim 27 further comprising a data structure, and wherein the cache manager outputs the request to synchronize the content into the data structure.

33. The system of claim 32 wherein the data structure comprises a queue.

34. The system of claim 33 wherein the queue comprises a FIFO queue.

35. The system of claim 32 further comprising a mechanism for removing the request from the data structure and for sending the request to a content server.

36. The system of claim 35 wherein the mechanism is a dequeuing mechanism that dequeues the request for content based on criteria being met.

37. The system of claim 35 wherein the criteria includes a time duration.

38. The system of claim 36 wherein the criteria includes an operating state of the system.

39. In a computer system, a method of specifying how cached content may be synchronized, comprising, providing information indicative of a state wherein cached content may be used without waiting for a synchronization result and a request for synchronization thereof output; and associating the information with the content such that if the state is achieved relative to current state information, the cached content will be used without waiting for a synchronization result and a request for synchronization of the content will be output.

40. The method of claim 39, wherein the information is associated with the content via an HTTP header.

41. The method of claim 39, wherein the information comprises a post-check header and a pre-check header to specify a time period in which cached content may be used and a request for synchronization thereof output.

42. The method of claim 39 further comprising, downloading the content and information associated therewith to a client.

43. The method of claim 42 further comprising, receiving the content and information at a client, evaluating a current state at the client, and if the current state corresponds to the state wherein cached content may be used and a request for synchronization thereof output, using the cached content and requesting synchronization thereof at the client.

44. A computer-readable medium including computer-executable instructions for performing the method of claim 18.

45. A computer-readable medium including computer-executable instructions for performing the method of claim 39.

* * * * *